UNITED STATES PATENT OFFICE.

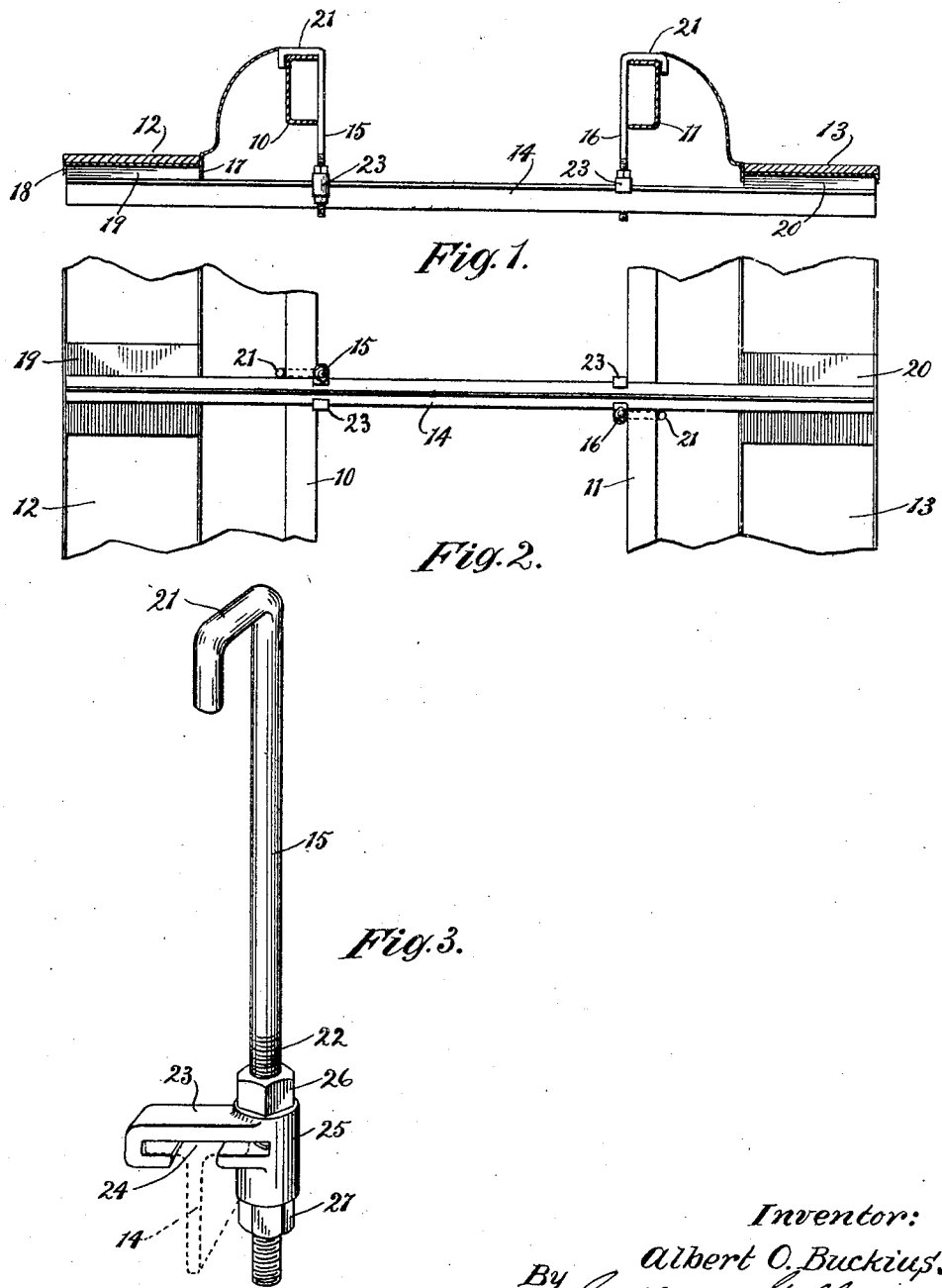

ALBERT O. BUCKIUS, JR., OF CHICAGO, ILLINOIS, ASSIGNOR TO CHICAGO MANUFACTURING AND DISTRIBUTING CO., A CORPORATION OF ILLINOIS.

VEHICLE-BODY BRACE.

1,328,415.

Specification of Letters Patent.

Patented Jan. 20, 1920.

Application filed May 5, 1919. Serial No. 294,683.

*To all whom it may concern:*

Be it known that I, ALBERT O. BUCKIUS, Jr., a citizen of the United States, and resident of Chicago, county of Cook, and State of Illinois, have invented certain new and useful Improvements in Vehicle-Body Braces, of which the following is a specification, and which are illustrated in the accompanying drawings, forming a part thereof.

The invention relates to vehicles and particularly to those having projections at the sides of the vehicle body, such as the steps or so-called running boards of an automobile. As these projecting parts of an automobile are not directly carried by the longitudinal frame members or sills of the body, special provision against the sagging or loosening of the parts is frequently required to be made, and the object of the invention is to provide a brace which may be readily applied to a vehicle body to afford additional support for the projecting parts and to increase the rigidity and strength of the entire structure.

In the accompanying drawings;

Figure 1 is a detail transverse sectional view of an automobile body showing the improved brace applied thereto;

Fig. 2 is an inverted plan view of the parts illustrated in Fig. 1, and

Fig. 3 is a perspective view showing one of the hangers of the improved brace, the position of the main supporting member of the brace being indicated by dotted lines.

The two longitudinal frame members or sills of an automobile are represented in the drawing at 10 and 11 respectively, the running boards or steps being shown at 12 and 13. As usual, the running boards 12 and 13 are located considerably beyond the frame members 10 and 11 at the two sides of the vehicle and in common practice they are supported only adjacent their opposite ends (not shown). A supplemental or additional support for the running boards, intermediate their ends, is therefore frequently required. In carrying out the present invention such a supplemental support is provided by the use of a transverse brace 14 in conjunction with the hangers 15, 16.

In the particular construction illustrated, the transverse brace 14 takes the form of a T-iron and it extends continuously between and below the running boards 12, 13, to the outer edges of the same. When the running boards 12, 13, are of sheet metal with flanged edges, as 17, 18, the engagement therewith of the brace 14 is preferably through flat board inserts, 19, 20, one of which fits against the underside of each running board between its said flanges.

The hangers 15, 16, are suspended from the sills 10, 11, and serve to draw the brace 14 and inserts 19, 20, firmly against the underside of the running boards. For this purpose, each of the hangers 15, 16, is formed with an overturned upper end 21 having hooked engagement with the corresponding sill 10, 11, and with a threaded stem 22. To avoid drilling the brace 14 and permit its use upon vehicles having the center sills 10, 11, differently spaced, each of the hangers 15, 16, is engaged with the brace 14 through a clamp generally designated 23.

As shown, each clamp 23 is formed with a recess 24 to receive the brace 14 and with a tubular hub portion 25 at one side to receive the corresponding hanger 15, 16. If the recess 24 extends for a substantial distance into the walls of the hub portion 25, pressure upon the two ends of this last mentioned portion causes the clamp to bend upon the brace and prevent its displacement. For this purpose and for adjusting the upward pressure of the brace upon the running boards, clamping nuts 26, 27, run upon the stem of the hanger above and below the hub portion of the clamp. When applying the device to an automobile in the first instance, as also when making any subsequent adjustment of the same, the lower nut 27 is preferably first adjusted, after which the upper nut 26 is run firmly down upon the upper end of the hub portion 25 of the clamp for locking the parts in adjusted position. To avoid any tendency to tilt the brace 14, the two clamps 23 are desirably turned in opposite directions, thereby locating the stems of the two hangers 15, 16, upon opposite sides of the brace as most clearly shown in Fig. 2.

I claim as my invention:

1. The combination with the two longitudinal sills and running boards of a vehicle body, of a bar extending transversely under the said sills and having supporting engagement with the running boards at its opposite ends, a hook having a threaded stem suspended from each of the sills, a split clamp having an integral upright tubular hub portion at one side of the same, running on the bar in line with each of the sills, the opening of each clamp extending into the walls of its hub portion and the stems of the said hooks being extended through the hubs of the corresponding clamps, an adjusting nut running on the stem of each hook below the corresponding clamp and an adjusting and locking nut running on the stem of each hook above the corresponding clamp.

2. In a vehicle body brace, in combination, a transverse supporting bar, a suspending member therefor having a threaded stem, a split clamp having an integral tubular hub portion at one side of the same running on the bar, the clamp opening extending into the walls of its hub portion and the threaded stem of the suspending member being extended through the bore of the clamp hub, and clamping nuts running on the stem of the said suspending member at opposite sides of the clamp hub.

ALBERT O. BUCKIUS, Jr.